United States Patent Office 3,684,509

Patented Aug. 15, 1972

3,684,509

USE OF PHOTOSENSITIVE MASSICOT (PbO) IN PHYSICAL DEVELOPMENT PROCESS

Walter August van den Heuvel, Berchemboslaan 1, Berchem, Belgium; Johan Eugeen Vanhalst, Oosterveldlaan 119, Wilrijk, Belgium; Eric Maria Brinckman, Rietveld 12, Mortsel, Belgium; and Frans Clement Heugebaert, Pronkenbergstraat 10, Kontich, Belgium No Drawing. Filed Nov. 12, 1969, Ser. No. 876,067

Claims priority, application Great Britain, Nov. 12, 1968, 53,671/68

Int. Cl. G03c 5/24

U.S. Cl. 96—48 22 Claims

ABSTRACT OF THE DISCLOSURE

Photosensitive image formation by imagewise exposure and physical development wherein the photosensitive medium contains photosensitive lead oxide with at least 25% thereof being yellow lead oxide having an orthorhombic crystalline structure (massicot) and in admixture therewith a chemical sensitizing agent which is either an organic polyfunctional compound having at least two hydroxy, mercapto or non-tertiary amino groups or a sulphur compound or a selenium or tellurium analog thereof and which possesses reducing properties and/or contains a releasable sulphur, selenium or tellurium atom.

The present invention relates to a method of producing visible images by using a semiconductor substance.

In the United Kingdom patent specification 1,043,250 an image-forming technique has been proposed according to which a semiconductor, e.g. lead monoxide, is information-wise exposed to an active electromagnetic radiation in order to form a reversible latent image pattern, which can be erased or developed at a stage remote in space and/or time from the exposure. In other words, the exposed surface can be stored after exposure, in the absence of radiation to which the surface is sensitive, and developed in a separate stage temporally and/or spacially remote from the exposure stage.

In accordance with the practice of the said image forming technique the information-wise exposure forms in the recording medium a pattern of differential chemical reactivity. In other words an image pattern of chemical reactivity is established in the exposed portions of the recording medium. Said image pattern is reversible and can be erased if desired, or alternatively, said image pattern can be made permanent by contacting the activated portions of the medium with suitable oxidizing or reducing agents. The reaction products of said agents form the permanent image pattern whereas said semiconductor remains essentially unchanged chemically after contact with said redox system.

For forming said permanent image, solutions containing noble metal ions are used, or other materials of comparable redox potential that are reduced at the activated (exposed semiconductor sites. If the degree of semiconductor activation is high, the quantity of, e.g., metallic silver formed by reduction of silver ions during development will be sufficient to form a visible image directly.

If the image is not made visible directly by said treatment it can be developed at will by development processes involving image intensification.

In developing the image where no image intensification is necessary, and where no visible images are produced directly upon development unless the semiconductor surface has been highly activated by long exposure to activating radiation (or by exposures to intense sources of such radiation), solutions of copper, mercury, silver, gold and other noble metals are convenient developing agents.

These ions or other materials of comparable redox potential such as dyes like methylene blue, are reduced at the activated semiconductor sites produced by exposure to the activating radiation such that no more than one molecule or atom of the developing agent is reduced for each activated site produced in the semiconductor by photon bombardment during exposure to activating radiation.

Thus, if the degree of semiconductor activation is high, the quantity of, e.g. metallic silver formed by reduction of silver ions during development will be sufficient to form a visible image directly. If not, a "latent developed image" will be produced in the semiconductor. Such an image is irreversible and not subject to semiconductive decay as is the reversible image in the semiconductor before development, and therefore can be stored for long periods, and developed at will by development processes involving image intensification.

In image intensification development, materials such as silver ions, mercury(I) ions, and mercury(II) ions, which are reducible by the light-activated semiconductor to finely divided black-appearing metallic silver or mercury, are used with a chemical redox system, preferably an organic redox system comprising hydroquinone or p-methylamino-phenol sulphate. The ions and redox systems are contacted with the activated semiconductor surface separately or in admixture.

Image intensification using these developers results from the fact that mixtures of metal ions with organic reducing agents of the type described are highly sensitive to metal, e.g., metallic silver or mercury, deposited by interaction of silver or mercury ions with activated semiconductor sites on the recording medium. Upon precipitation of metal at these sites, further precipitation of metal from the mixture occurs preferentially at the sites where metal is already present. The quantity of metal initially deposited being too small to give a visible image will be increased by contacting the photoconductor with a chemical redox system such as hydroquinone, which causes further preferential deposition of silver ions at the sites where the first silver was deposited, thus intensifying the first image.

As semiconductor suited for the above image-forming process have been described specific semiconductor materials such as titanium dioxide, zinc oxide, zinc sulphide, lead monoxide, red lead oxide, silicon dioxide, aluminium oxide, chromium oxide, osmium oxide and cadmium sulphide.

There are two types of lead(II) oxide viz the yellow lead(II) oxide, also called massicot, which has an orthorhombic crystalline structure, and the red to tan lead(II) oxide, also called litharge, which has a tetragonal crystalline structure.

It has been found now that in the recording technique as described above the yellow type (orthorhombic) lead (II) oxide yields better results than the red type. This does not exclude, however, the use of mixtures, e.g. crystalline mixtures of yellow and red type lead(II) oxide containing preferably at least 25% by weight of the former.

The yellow lead(II) oxide may be doped with metals, e.g. with bismuth, molybdenum, lanthanum, copper and silver.

The state of subdivision of the lead(II) oxide particles is not critical, although particles with as high a specific area as possible are preferred. In that respect is mentioned that very good results are obtained with yellow lead((II) oxide powders having an average specific area of at least 0.3 sq. m. per gram. The lead(II) oxide yields the advantage over other suitable semiconductors such as titanium dioxide ($TiO_2$) that with a sufficient intense exposure to active radiation an irreversible non-visible developable latent image, or a visible intensifiable print-out image can be obtained.

For the production of print-out images by means of yellow lead(II) oxide reference is made to the United Kingdom patent application 53,670/68.

When using a mixture of both of the said types of lead (II) oxide it is interesting to note that the spectral range wherein absorption takes place can be from 380 nm. till about 620 nm., blue light, however, being considerably more absorbed than red light. The light absorption by such lead(II) oxide mixtures over practically the whole range of the visible spectrum is particularly interesting in those cases wherein more than one information separately or simultaneously has to be recorded with light of different wavelength range, e.g. as in the recording of a grid or screen and a continuous tone image in superposition.

According to a preferred embodiment the lead(II) oxide in used in admixture with a so-called chemical sensitizing agent. It has been found that a marked increase of print-out photosensitivity is obtained by using said lead(II) oxide in admixture with an organic polyfunctional compound, of which at least two chemical functional groups are hydroxy and/or mercapto and/or primary or secondary amino groups.

Particularly preferred organic polyfunctional compounds have at least one hydroxy group or neighbouring hydroxy, mercapto, primary or secondary amino groups as e.g. in 1,2-diol compounds, 1,2-hydroxy amino compounds, 1,2-mercapto hydroxy compounds, 1,2-mercapto amino compounds or 1,2-diamino compounds. Hydrogen in one of the 1,2 positioned or ortho groups can be replaced by a substituent e.g. an aliphatic group preferably an alkyl group.

A particularly valuable chemical sensitization is obtained by using for 1 mole of lead(II) oxide an amount of said polyfunctional organic compound in the range of 0.01 to 1.5 equivalent calculated on the basis of the hydroxy, mercapto, primary amino or secondary amino functional groups contained therein. Optimal sensitizing results are obtained with a said polyfunctional organic compound that contains at least one hydroxy group and is used in an amount of 1 mole divided by the number of hydroxy groups present in the polyfunctional molecule per mole of photosensitive lead(II) oxide. For example, 0.5 mole of diethanolamine is used in admixture with 1 mole of lead(II) oxide.

Chemical sensitizers for the recording element in dry as well as in wet state correspond to the following general formulae:

(1) $X_1—Q_1—X_2$ (2) $X_3—Q_2—X_4$ (3) $X_3—(CH_2—CH_2—Y)_m—CH_2—CH_2—X_4$ (4)

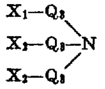

wherein:

$X_1$ stands for —OH, —SH, —NHR or a cyclic amino group, e.g. a

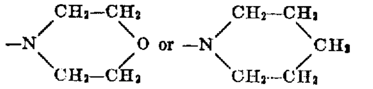

group $X_2$ stands for —OH, —SH or a —NHR group, $X_3$ stands for a —OH, —SH, —NHR, $—CH_2OH$, $—CH_2SH$, $—CH_2NHR$, —CO·R, $—C(R)_3$, a cyclic amino group, or halogen, $X_4$ stands for —OH, —SH, a —NHR, $—CH_2OH$, $—CH_2SH$ or a $—CH_2NHR$ group, $m$ stands for 1 or 2, $Q_1$ stands for a $—CH_2—CH_2—$ or a $—CH_2—C\equiv C—CH_2—$ group, $Q_2$ stands for a

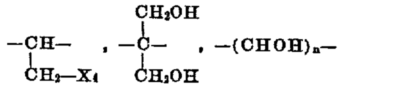

wherein $n$ stands for a positive integer preferably 1 to 6, or a

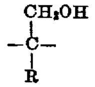

group, $Q_3$ stands for a lower ($C_1$–$C_5$) alkylene group, preferably an ethylene or propylene group, including a substituted ethylene or propylene group e.g. substituted with a hydroxy, an amino, a mercapto or a methyl group, Y stands for oxygen, sulphur or a

group, and

R in the preceding R substituted groups stands for hydrogen or an organic group e.g. an aliphatic group preferably a lower alkyl ($C_1$–$C_5$) group or an aromatic group e.g. a phenyl group.

The present invention includes further the use of mono- and/or oligosaccharides as chemical sensitizers.

Specific examples of chemically sensitizing mono- and oligosac-charides and of chemically sensitizing organic polyfunctional compounds according to the above general formulae are listed in Table 1 hereinafter.

TABLE 1

| | |
|---|---|
| (1) | $(HOCH_2—CH_2—)_2NH$ |
| (2) | $HOCH_2—CH_2—NH—CH_2—CH_2—NH_2$ |
| (3) | $(HOCH_2—CH_2)_3N$ |
| (4) | $(HOCH_2—CH_2—)_2N—CH_3$ |
| (5) | 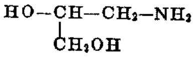 |
| (6) | 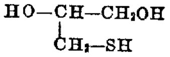 |
| (7) | $HS—CH_2—CH_2—NH_2$ |
| (8) | $(HOCH_2—CH_2—)_2S$ |
| (9) | $HOCH_2—CH_2—NH_2$ |
| (10) | $HOCH_2—CH_2OH$ |
| (11) | $H_2N—CH_2—CH_2—NH_2$ |
| (12) | $(H_2N—CH_2CH_2—)_2NH$ |
| (13) | 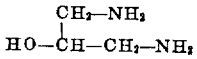 |
| (14) | $HOCH_2—CH_2—)_2O$ |
| (15) | 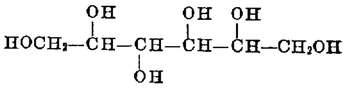 |
| (16) | 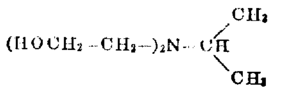 |
| (17) | $O(—CH_2—CH_2—NH_2)_2$ |
| (18) | $HOCH_2—CHOH—CH_2OH$ |
| (19) | fructose |
| (20) | glucose |

(21) arabinose
(22) ribose
(23) galactose
(24) mannose
(25) sucrose
(26) xylose
(27) raffinose
(28) $HOCH_2—C(CH_2OH)_2—NH_2$
(29) 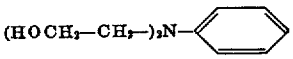
(30) $(HOCH(CH_3)—CH_2—)_3N$
(31) $HOCH_2—C≡C—CH_2OH$
(32) $HOCH_2—CH_2SH$
(33) $(HOCH_2)_4C$
(34) $(HOCH_2)_3C—CH_2—CH_3$
(35) 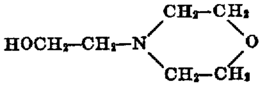
(36) $HO(CH_2)_2—O—(CH_2)_2—O—(CH_2)_2—OH$
(37) $HOCH_2—(CHOH)_4—CH_2OH$ Other compounds that sensitize the lead(II) oxide-containing recording layer, particularly in wet state and possess reducing properties and/or contain a releasable sulphur, selenium or tellurium atom are selected from the group consisting of:

(1) thiol compounds or thiolates preferably having a water-soluble character, e.g. a thiol compound or thiolate containing a hydrophilic group (a group increasing the water-solubility of the compound) such as a hydroxyl group or an ionic group e.g. a free acid, carboxylate or sulphonic acid salt group,
(2) compounds corresponding to the following structural formula:

$$\left[R—S—\overset{O}{\underset{O}{\overset{\|}{\underset{\|}{S}}}}—O^-\right]M^+$$

wherein:

M+ represents a cation, e.g. a hydrogen ion, metal ion or onium group but is not present when the radical R already contains a cationic rest (betaine type compound) and
R represents an organic group, e.g. an alkyl, aryl or heterocyclic group including said groups in substituted state, preferably substituted with a hydrophilic group, e.g. a hydroxyl group, a carboxylate group or a sulphonate group.

(3) compounds yielding $HSO_3^-$ ions,
(4) compounds yielding $SO_3^{--}$ ions,
(5) compounds yielding $HOCH_2—\underset{\|}{S}O^-$ ions, $M—O—S—O^-$ ions
$\quad\quad\quad O$ wherein M is a cation, or $SO_2^{--}$ ions derived from the hypothetical sulphoxylic acid $S(OH)_2$,
(6) compounds yielding $S^{--}$ ions or $M—S^-$ ions, wherein M is a cation,
(7) compounds yielding $S_2O_4^{--}$ ions,
(8) compounds yielding $SCN^-$ ions,
(9) organic isothiocyanates,

(10) compounds containing a $$—S—C\begin{matrix}\nearrow NH\\ \searrow NH_2\end{matrix}$$

group,
(11) compounds containing a $$>P=S \text{ group,}$$

(12) compounds containing a —S—S— group,
(13) compounds containing a $—S_x—$ group, wherein $x$ is larger than 2,
(14) compounds containing a $—SR_1$ group, wherein $R_1$ is an organic group linked through carbon to the sulphur atom, e.g. acyl preferably $—COCH_3$, alkyl preferably $C_1$–$C_4$ alkyl, aryl e.g. phenyl or a heterocyclic group,
(15) compounds containing a —S—CX=N— group wherin X is an amino or an hydrazino group, and said sulphur-containing group makes part of a heterocyclic ring or ring system,
(16) compounds containing a >C=S group,
(17) compounds yielding $S_2O_3^{--}$ ions,
(18) xanthates, i.e. salts of xanthic acid having the general formula: $R_2O.CS.SM$, wherein M is a cation and $R_2$ is an alkyl or substituted alkyl group, e.g. a benzyl group.

Said chemical sensitizing compounds may be used in a rather large amount, e.g. in a ratio by weight up to 1:2 in respect of the photosensitive lead(II) oxide, preferably in a range of 1:100 to 1:1.

Particularly suited representatives of that group are listed in the following Table 2.

TABLE 2

| | |
|---|---|
| (1) | $Na_2S_2O_3$ |
| (2) | $Na_2S_2O_4$ |
| (3) | $Na_3AsS_4.8H_2O$ |
| (4) | $P_2S_5$ |
| (5) | KSCN |
| (6) | $NaHSO_3$ |
| (7) | $NH_4SCN$ |
| (8) | $HS—CH_2—COOH$ |
| (9) | $HS—CH_2—CH(SH)—CH_2—OH$ |
| (10) | $HOOC—CH_2—CH(SH)—COOH$ (drawn: $CH_2—COOH$ / $CH—COOH$ / $SH$) |
| (11) | 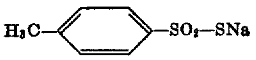 |
| (12) | 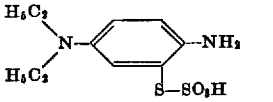 |
| (13) | 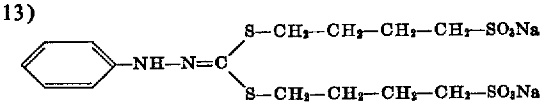 |
| (14) | $H_2N—CH_2—CH_2—S—S—CH_2—CH_2—NH_2.2HCl$ |
| (15) | $S=C(SK)—OC_2H_5$ |
| (16) | $H_3C—CO—S—CH_2—CH_2—CH_2—SO_3Na$ |
| (17) | $H_3C—CS—NH_2$ |
| (18) | $H_2N—CS—NH_2$ |
| (19) | $H_2C=CH—CH_2—NH—CS—NH_2$ |

(20)
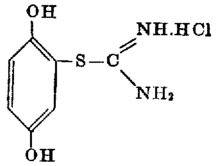

(21) $H_2N-CS-NH-NH_2$

(22)
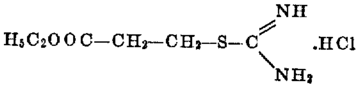

(23) $H_2N-CS-NH-NH-CS-NH_2$

(24)
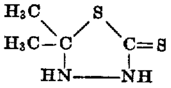

(25)
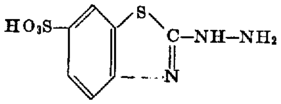

(26)
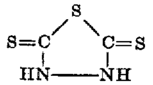

(27) $H_3C-CO-NH-CS-NH_2$

(28) $H_2N-CS-CS-NH_2$

(29) $H_2N-CH_2-CH_2-SH$

(30) $H_5C_2-S-CH_2-CH_2-NH_2$

(31) $(NH_4)_2S_2O_3$

(32) $K_2S_2O_5$

(33) $Na_2SO_3$

(34)
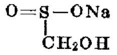

As selenium and tellurium compounds are particularly mentioned allylselenourea and allyltellurourea. Further have to be mentioned selenium and tellurium compounds, which are derived structurally from oxyacids, wherein one or more of the oxygen atoms has been replaced by selenium or tellurium.

Other chemical sensitizing agents particularly suitable for sensitizing the recording material in wet state are listed in the following Table 3.

TABLE 3

(1)
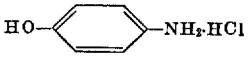

(2)
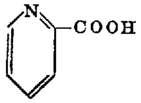

(3)
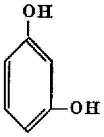

(4) $H_2N-NH_2 \cdot H_2O$ (5)
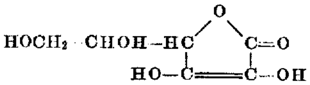

(6)

(7)
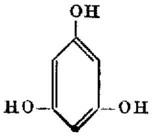

(8)
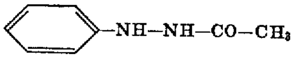

(9) $HOCH_2-CH_2-NH-NH_2$

(10) $H_3C-NH-NH_2$

(11) $NaH_2PO_2 \cdot H_2O$

(12)
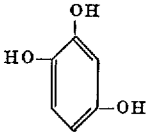

(13)
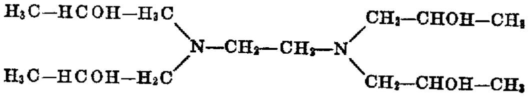

(14) $H_2N-CH_2-COOH$

(15)
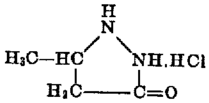

(16)
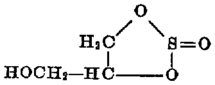

(17)
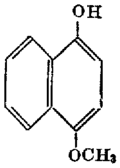

(18) $KAsO_2$

(19)
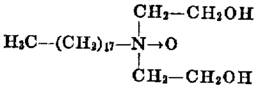

(20)
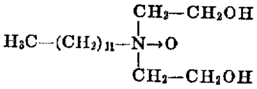

(21)
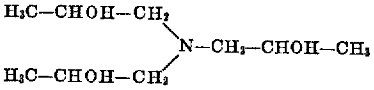

(22)

(23)
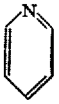

(24)
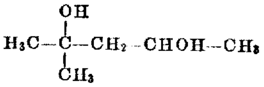

(25)
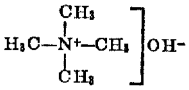

(26)

The chemical sensitizing compounds of Table 3 are preferably applied in the same amounts as specified for the compounds of the type of Table 2.

The recording material for use according to the present invention contains the lead(II) oxide in such a state it can be wetted with the processing liquids applied in development and image intensification. As processing liquids aqueous liquids and organic solvents are used, preferably those of the more polar type such as alcohols miscible with water. Preference is given to hydrophilic or water-permeable coatings. Water-permeability of the recording layer can be obtained by using a water-permeable or a porous binder medium.

The photo-sensitive lead(II) oxide may be treated with the chemical sensitizers before, during or after its application to the support. Preferably they are added to the coating composition before coating and intimately mixed therewith so that a chemical interaction can take place.

As suitable organic liquid permeable binding agents, e.g. methanol-penetrable binding agents, which are not soluble in water and which can be applied in dissolved state from an organic solvent, are particularly mentioned sucrose benzoate, partially or completely acetalized polyvinyl alcohol, e.g. copoly(vinyl alcohol/vinyl-n-butyral) and poly(vinyl-n-butyral), ethylcellulose, shellac, polyvinyl stearate, copoly(vinyl acetate/N-vinylpyrrolidone), copoly(methacrylic acid/methyl methacrylate) and copoly(acrylic acid/N-vinylpyrrolidone).

Hydrophilic water-permeable colloids are selected from the group of hydrophilic natural colloids, modified hydrophilic natural colloids or synthetic hydrophilic colloids. More particularly they may be selected from such film-forming natural or modified natural hydrophilic colloids that do not adversely affect the photographic properties of the light-sensitive lead compound, e.g. gelatin, glue, casein, zein, hydroxyethylcellulose, carboxymethylcellulose, hydroxypropylstarch, gum arabic, sodium alginate, and hydrophilic derivatives of such colloids. They may also be selected from synthetic hydrophilic polymers as, e.g., polyvinyl alcohol, partially acetalized polyvinyl alcohol or partially hydrolyzed polyvinyl acetate, preferably poly(vinyl-n-butyral/vinyl alcohol) containing at least 5 mole percent of vinyl alcohol units, polyvinyl-pyrrolidone, polyvinylamine, urea-formaldehyde resin, dimethylolmelamine-formaldehyde resin, polyethylene oxide, polyacrylamide, or polyacrylates and hydrophilic copolymers and derivatives of such polymers e.g. copoly(acrylic acid/acrylamide/sodium acrylate). As hydrophilic colloid gelatin is used preferably.

The hydrophilic binder material used in the recording layer is preferably hardened to some extent in order to obtain a layer with higher mechanical strength. Thus, e.g., a hydrophilic binding agent of the gelatin type may be hardened by reaction with an aldehyde such as formaldehyde or glyoxal. The hardening agents may be incorporated into the coating composition by admixture, or into the coated layer by imbibition. The use of latent hardening agents, from which, e.g., the hardening agent is generated by heating, is not excluded.

The amount and type of hardening agent depends on the mechanical strength desired. When gelatin is used the amount of hardening agent may be in the range of 0.5 to 5% by weight in respect of gelatin. The hardening of the recording layer may be effected with a solution containing the hardening agent in an amount of 2 to 25% by weight.

The flexibility of the recording layer may be improved by means of plasticizing agents known in the art, e.g., latices, and phosphonic or phosphoric acid esters of polyols and/or alkylene glycol monoalkyl ethers and/or polyoxyalkylene glycol monoalkyl ethers.

The support of the recording material securing sufficient mechanical strength to the material may be a paper support, a metal sheet or a synthetic film support that is either transparent or not. The recording layer must strongly adhere to the support for not getting loose therefrom during processing. If necessary one or more appropriate subbing layers are applied between the support and the recording layer.

The ratio by weight of binding agent to light-sensitive lead compound is preferably between 9:1 and 1:3. The amount of light-sensitive lead compound per sq. m. can vary within wide limits but is preferably at least 1 g. per sq. m.

The recording materials of the present invention are suited for the production of line work as well as for the reproduction of continuous tone originals and for recording signals as are obtained from modulated spot-recording systems and recording systems wherein penetrating rays such as X-rays, beta-rays or gamma-rays are applied.

The exposure of recording materials described in the present invention preferably proceeds with electromagnetic radiation rich in ultra-violet rays, e.g. produced by a carbon arc lamp or high-pressure mercury vapour tube. When dye-sensitized lead(II) oxide is used a developable or intensifiable latent image can be obtained by using a tungsten filament lamp or flash lamp mainly emitting in the visible spectrum.

Suitable spectrally sensitizing dyes can be found in the class of the methine dyes known in silver halide photography, e.g.

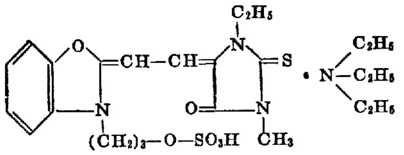

and

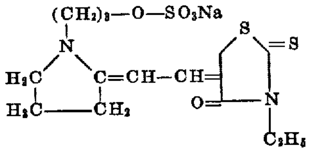

The recording material may be exposed in dry or wet state, e.g., after dipping in an aqueous solution containing the above chemical sensitizers.

When the exposure is carried out without previous wetting, the recording material preferably contains hygroscopic compounds or wetting agents, e.g., glycerol, sorbitol, low molecular weight polyoxyethylene glycol (e.g. having a molecular weight lower than 500), or water-attracting salts and hydratable metal oxides, e.g., lithium chloride and zinc oxide.

The sensitivity is increased by heating the chemically sensitized recording material. According to a preferred embodiment the recording material is heated between 60° and 150° C. during its information-wise exposure.

The development of the latent image by means of a redox-system containing a reducing agent and metal ions of a metal that is more electropositive than lead and/or ions of compounds, e.g. dyestuffs or leuco compounds of dyes having a redox-potential not lower than that of said ions is called here a physical development. So, the development can be carried out with methylene blue, silver ions, mercury(II) ions, mercury(I) ions, copper (II) ions or copper(I) ions in the presence of a reducing agent, e.g. 1 - phenyl - 3 - pyrazolidinone and hydroquinone. In the physical development the more electropositive metal ions and the reducing agent are preferably kept in separate solutions in order to avoid alteration of the developing bath.

Contrary to classical silver halide emulsion developers, the physical developing composition need not to be alkaline so that the pH is preferably kept below 7.

Suitable developing compositions for physical development are described in the Belgian patent specification 662,491 and the United Kingdom patent specification 1,043,250.

According to a simple physical development process the latent image, which according to some theoretical consideration consists of lead metal nuclei and in case sulphur sensitization is applied probably consists at least partly of lead sulphide nuclei, is successively treated with a solution from which silver metal can be separated on these nuclei, e.g. a silver nitrate solution, a solution containing silver complexed with thiosulphate, and a solution containing a reducing agent for silver ions.

The silver image obtained in this way may be fixed or stabilized. Stabilization is a process wherein the recording layer is made incapable of being further developed on exposure to light. This may proceed by thoroughly removing the noble metal salts of the developer by washing, e.g. in water and/or alcohols such as methanol. According to another embodiment stabilization may also be based on the principle of conversion in the recording material of light-sensitive salts, e.g. silver nitrate, in non-light-sensitive salts that are not removed from the recording layer. This may be effected by a short treatment (2 to 3 sec.) of the recording medium with an aqueous solution containing a complexing agent for the noble metal ions, e.g. thiosulphate ions originating from sodium thiosulphate, or isothiocyanate ions originating from sodium isothiocyanate, when silver ions are applied.

Other suitable stabilizing compositions contain dissolved halide ions e.g. originating from ammonium fluoride, and ammonium chloride, and/or contain a water-soluble carboxylic acid e.g. acetic acid.

Fixation can be carried out by treating the physically developed material for a larger time than in stabilisation with a solution containing thiosulphate ions or other known silver ion-complexing agents dissolving the light-sensitive salts and transferring them to the fixing bath.

Preferably a mixture yielding thiosulphate and chloride ions is used e.g. an aqueous mixture of sodium thiosulphate and ammonium chloride.

The stabilizing or fixing solutions may contain water-soluble sulphites or hydrogen sulphites in order to prevent yellowing of the fixed image by oxidation of the reducing agent.

With red and yellow lead (II) oxide a recording medium is obtained that has no white image background. If desired, the recording surface may be bleached.

In the United States patent specification 3,008,825 a method has been described for that purpose. According to the embodiment described therein lead(II) oxide is allowed to react with a suitable acid e.g. acetic acid.

Bleaching of the surface of the lead(II) oxide grains can also occur by allowing to react therewith an halide salt, e.g. from an aqueous calcium chloride solution, whereby a chemical substance with white colour or a more neutral colour tone is formed on the lead(II) oxide grains.

Such process is described in the United Kingdom patent specification 53,672/68 filed on even date and which has to be read in conjunction herewith.

The said substances used for bleaching purposes may be present, e.g., in the stabilization or fixing liquid.

The following example illustrates the present invention.

EXAMPLE 1

24 g. of yellow lead(II) oxide containing 30 p.p.m. of bismuth were ball-milled for 1 h. in 32 g. of demineralised water. To the suspension obtained was added the following solution at 35° C. with stirring:

| | G. |
|---|---|
| 15% solution of gelatin in demineralised water | 100 |
| Demineralised water | 28 |
| Ethylene glycol | 6 |
| 12.5% solution of saponine in demineralised water | 1 |

This new suspension was applied in such a way to a subbed cellulose triacetate support that the light-sensitive layer formed was 25μ thick. The light-sensitive material obtained was then exposed through a transparent negative in a Buroza 600 diazoprint apparatus (trade name of Atlas, Delft, Netherlands) at a travelling speed of 8 cm./sec. The exposed material on which only a faint print-out image could be observed was then successively dipped in the following baths:

(a) for 10 sec. in a bath consisting of a 2% solution of silver nitrate in demineralised water,
(b) for 2 sec. in a solution of 1 g. of p-methylaminophenol sulphate in 89 ml. of demineralised water and 10 ml. of glacial acetic acid,
(c) for 20 sec. in a 10% solution of glacial acetic acid in demineralised water.

After rinsing and drying a violet positive silver image was left on the material.

EXAMPLE 2

15 g. of yellow lead(II) oxide containing 30 p.p.m. of bismuth were ball-milled for 1 h. in a solution of 4 g. of copoly(vinyl-n-butyral/vinyl alcohol) containing 80% by weight of vinyl-n-butyral, in 46 ml. of methanol. To the suspension obtained were added 3 g. of 2,3-dimercapto-1-propanol in 35 ml. of methanol and the whole was coated on a subbed cellulose triacetate support so that after drying the light-sensitive layer formed was 18μ thick. The light-sensitive material obtained was then exposed through a transparent negative in a Buroza 600 (trade name) diazoprint apparatus at a travelling speed of 4 cm./sec. The exposed material on which only a very faint print-out image could be observed was then successively dipped in the following baths:

(a) for 10 sec. in a bath consisting of:
demineralized water—85 ml.
methanol—10 ml.
silver nitrate—5 g.
(b) for 10 sec. in a bath consisting of:
demineralized water—88 ml.
methanol—10 ml.
p-methylaminophenol sulphate—2 g.
(c) for 5 sec. in a 10% solution of glacial acetic acid in demineralized water.

After rinsing and drying a greyish black positive silver image was obtained on the material.

EXAMPLE 3

24 g. of yellow lead(II) oxide containing 30 p.p.m. of bismuth were ball-milled for 1 h. in 32 g. of demineralized water. To the suspension obtained was added the following solution at 35° C. with stirring:

| | G. |
|---|---|
| 15% solution of gelatin in demineralized water | 100 |
| Ascorbic acid | 8 |
| Demineralized water | 28 |
| Glycerol | 6 |
| 12.5% solution of saponine in demineralized water | 1 |

This new suspension was applied in such a way to a paper support that 25 g. of lead(II) oxide were present per sq.m. After drying, the light-sensitive material obtained was exposed as described in Example 2 and dipped for 20 sec. in a bath consisting of a 1% solution of silver nitrate in demineralized water acidified with nitric acid to a pH of 1.2. After rinsing for 30 sec. in running water, dipping for 20 sec. in a 10% solution of glacial acetic acid in demineralized water, and again rinsing for 30 sec. in running water, a brownish-black silver image was left on the material.

We claim:

1. In a method of producing a visible image in a photosensitive medium by the steps of imagewise exposing said medium to activating radiation to render said medium capable of undergoing a chemical reaction in the exposed regions thereof, and contacting at least said exposed regions with at least one liquid for physically developing the same and containing a reducing agent and ions of a metal more electropositive than lead or of a compound having a redox potential not lower than said metal ions, such liquid forming a redox system reacting on contact at said exposed region to form at least one reaction product defining a visible image, the improvement wherein said medium contains photosensitive lead(II) oxide as the essential photosensitive constituent, at least 25% by weight of said lead(II) oxide being yellow lead(II) oxide having an orthorhombic crystalline system (masicot), and in admixture with said photosensitive lead(II) oxide a chemical sensitizing agent increasing the light-sensitivity of said lead oxide a sufficient extent to produce a visible image in said medium upon exposure to said radiation and contact with said physical developing liquid and selected of the group consisting of:

(1) an organic polyfunctional compound having at least two chemical functional groups each being selected from a hydroxy, mercapto, or primary or secondary amino groups, and having one of the following general formulae:

$$X_1{-}Q_1{-}X_1 \qquad (1)$$

$$X_3{-}Q_2{-}X_4 \qquad (2)$$

$$X_3{-}(CH_2{-}CH_2{-}Y)_m{-}CH_2{-}CH_2{-}X_4 \qquad (3)$$

$$\begin{matrix} X_1{-}Q_3 \diagdown & \\ X_2{-}Q_3{-}N & \\ X_2{-}Q_3 \diagup & \end{matrix} \qquad (4)$$

wherein:

$X_1$ stands for a —OH, —SH, —NHR or a cyclic amino group, $X_2$ stands for a —OH, —SH or —NHR group, $X_3$ stands for a —OH, $$-SH, -NHR, -CH_2OH, -CH_2SH, -CH_2NHR, -\underset{\underset{O}{\|}}{C}R, C(R)_2-$$

halogen or a cyclic amino group, $X_4$ stands for a —OH, —SH, —NHR, $—CH_2OH$, $—CH_2SH$ or a $—CH_2NHR$ group,

*m* stands for 1 or 2, $Q_1$ stands for $—CH_2—CH_2—$ or a $$—CH_2—C\equiv C—CH_2—$$

group, $Q_2$ stands for a $$-\underset{\underset{CH_2-X_4}{|}}{CH}- \ , \ -\overset{\overset{CH_2OH}{|}}{\underset{\underset{CH_2OH}{|}}{C}}- \ , \ -(CHOH)_n-$$

wherein *n* stands for a positive integer or a $$-\overset{\overset{CN_2OH}{|}}{\underset{\underset{R}{|}}{C}}-$$

group, $Q_3$ stands for a lower ($C_1$–$C_5$) alkylene group including a substituted lower alkylene group, Y stands for oxygen, sulphur or a $$-\underset{\underset{R}{|}}{N}-$$

group, and

R represents an aliphatic or aromatic group;

(2) a sulphur compound or a compound wherein sulphur has been replaced by selenium or tellurium which possesses reducing properties and/or contains a releasable sulphur, selenium or tellurium atom, and corresponding to one of the general formulae:

thiol compounds or thiolates (1)

compounds corresponding to the following structural formula:

$$\left[R-S-\overset{\overset{O}{\|}}{\underset{\underset{O}{\|}}{S}}-O^-\right]M^+ \qquad (2)$$

wherein:

$M^+$ represents a cation which is missing when the radical R already contains a positive charge, and R represents an alkyl, aryl or heterocyclic group, compounds yielding $HSO_3^-$ ions (3)

compounds yielding $SO_3^{--}$ ions (4)

compounds yielding $HOCH_2-\underset{\underset{O}{\|}}{S}O^-$ ions, $M-O-S-O^-$ ions (5)

wherein M is a cation or $SO_2^{--}$ ions derived from the hypothetical sulphoxylic acid $S(OH)_2$, compounds yielding $S^{--}$ ions or $M-S^-$ ions (6)

wherein M is a cation, compounds yielding $S_2O_4^{--}$ ions (7)

compounds yielding $SCN^-$ ions (8)

organic isothiocyanates (9)

compounds containing a $-S-C\begin{matrix}\diagup\!\!\!\!= NH \\ \diagdown NH_2\end{matrix}$ group (10)

compounds containing a $\begin{matrix}\diagdown \\ -P{=}S \\ \diagup\end{matrix}$ group (11)

compounds containing a —S—S group (12)

compounds containing a $—S_x—$ group (13)

wherein *x* is larger than 2, compounds containing a $—SR_1$ group (14)

wherein $R_1$ is an acyl, alkyl, aryl or heterocyclic group linked through carbon to the sulphur atom, compounds containing a —S—CX=N— group (15)

wherein X is an amino or an hydrazino group, and said sulphur-containing group forms part of a heterocyclic ring or ring system, compounds containing a >C=S group (16)

compounds yielding $S_2O_3^{--}$ ions (17)

and xanthates (18)

(3) a compound identified in Table 3 of the specification.

2. A method according to claim 1 wherein the color tone of the lead(II) oxide is brought closer to the neutral color point by means of a bleaching treatment with an acid or halide thereby converts said lead(II) oxide to a substantially colorless lead salt.

3. A process as in claim 1 wherein said reducing agents and said ions are contained in separate developing liquids which are applied in turn to said recording medium.

4. A method according to claim 1, wherein said polyfunctional organic compound is one of the compounds identified in Table 1 of the specification.

5. A method according to claim 1, wherein the amount of polyfunctional compound is between 0.01 and 1.5 equivalents calculated on the basis of the hydroxy, mercapto, primary or secondary amino groups present in the said compound, per mole of lead(II) oxide.

6. A method according to claim 1, wherein said sensitizing compound is a compound identified in Table 2 of the specification.

7. A method according to claim 1, wherein said sulphur compound or compound wherein sulphur has been replaced by selenium or tellurium is used in a ratio by weight to lead(III) oxide in the range of 1:100 to 1:1.

8. A method according to claim 1, wherein said compound selected from Table 3 is used in a ratio by weight to lead(II) oxide in the range of 1:100 to 1:1.

9. A method according to claim 1, wherein the lead (II) oxide particles are composed of a crystalline mixture of orthorhombic and tetragonal lead(II) oxide.

10. A method according to claim 9, wherein said lead (II) oxide is used in finely divided form dispersed in a binder medium permeable to said developing liquid.

11. A process according to claim 1, wherein said ions are silver ions, mercury(I) ions, mercury(II) ions, copper(II) ions or copper(I) ions.

12. A method according to claim 10, wherein the binder medium contains gelatin or partially acetalized polyvinyl alcohol.

13. A method according to claim 1, wherein the recording layer contains a wetting agent or water-attracting compound.

14. A method according to claim 13, wherein the water-attracting compound is glycerol.

15. A method according to claim 1, wherein the recording medium is exposed in wet state.

16. A method according to claim 11, wherein the image is stabilized by a thorough washing with water.

17. A method according to claim 11, wherein the image is formed by means of a liquid containing silver ions, and is stabilized or fixed by means of a liquid containing thiosulphate ions or isothiocyanate ions.

18. A method according to claim 11, wherein the image is stabilized by a treatment with a liquid composition containing halide ions and/or a water-soluble carboxylic acid.

19. A method according to claim 11, wherein the visible image formed in the recording medium is a silver image formed by ions derived from silver nitrate.

20. A method according to claim 19, wherein the image is stabilized or fixed by means of a liquid containing thiosulphate ions or isothiocyanate ions.

21. A method according to claim 11, wherein the image is stabilized with a liquid composition containing halide ions and/or a water-soluble carboxylic acid.

22. A method according to claim 1, wherein the recording material is heated during its imagewise exposure.

References Cited

UNITED STATES PATENTS

| | | | |
|---|---|---|---|
| 2,414,839 | 1/1947 | Schoen | 96—48 |
| 3,369,905 | 2/1968 | Jones et al. | 96—107 |
| 3,345,161 | 10/1967 | Mammino et al. | 252—501 |
| 3,453,141 | 7/1969 | Anolick et al. | 252—501 X |
| 3,008,825 | 11/1969 | Van Dorn et al. | 96—1.8 |
| 2,972,585 | 2/1961 | Beutler | 252—501 |

FOREIGN PATENTS

| | | | |
|---|---|---|---|
| 1,043,250 | 9/1966 | Great Britain | 96—48 |
| 997,031 | 6/1965 | Great Britain | 96—107 |

NORMAN G. TORCHIN, Primary Examiner

W. H. LOUIE, Jr., Assistant Examiner

U.S. Cl. X.R.

96—1.8, 88; 117—201; 252—501

UNITED STATES PATENT OFFICE
CERTIFICATE OF CORRECTION

Patent No. 3,684,509 Dated August 15, 1972

Inventor(s) Van den Heuvel et al

It is certified that error appears in the above-identified patent and that said Letters Patent are hereby corrected as shown below:

In the heading of the Patent, insert --

Assignee: Agfa-Gevaert, Mortsel, Belgium -- .

Column 13, Claim 1, line 12, correct the spelling of "(massicot)".

line 37, change "$C(R)_3$-" to -- -$C(R)_3$- --.

line 55, change "$CN_2OH$" to -- $CH_2OH$ --.

```
"CN2OH"          CH2OH
   |                |
  -C-              -C-
   |                |
   R                R
```

Signed and sealed this 8th day of May 1973.

(SEAL)
Attest:

EDWARD M.FLETCHER,JR.
Attesting Officer

ROBERT GOTTSCHALK
Commissioner of Patents